Patented Apr. 29, 1941

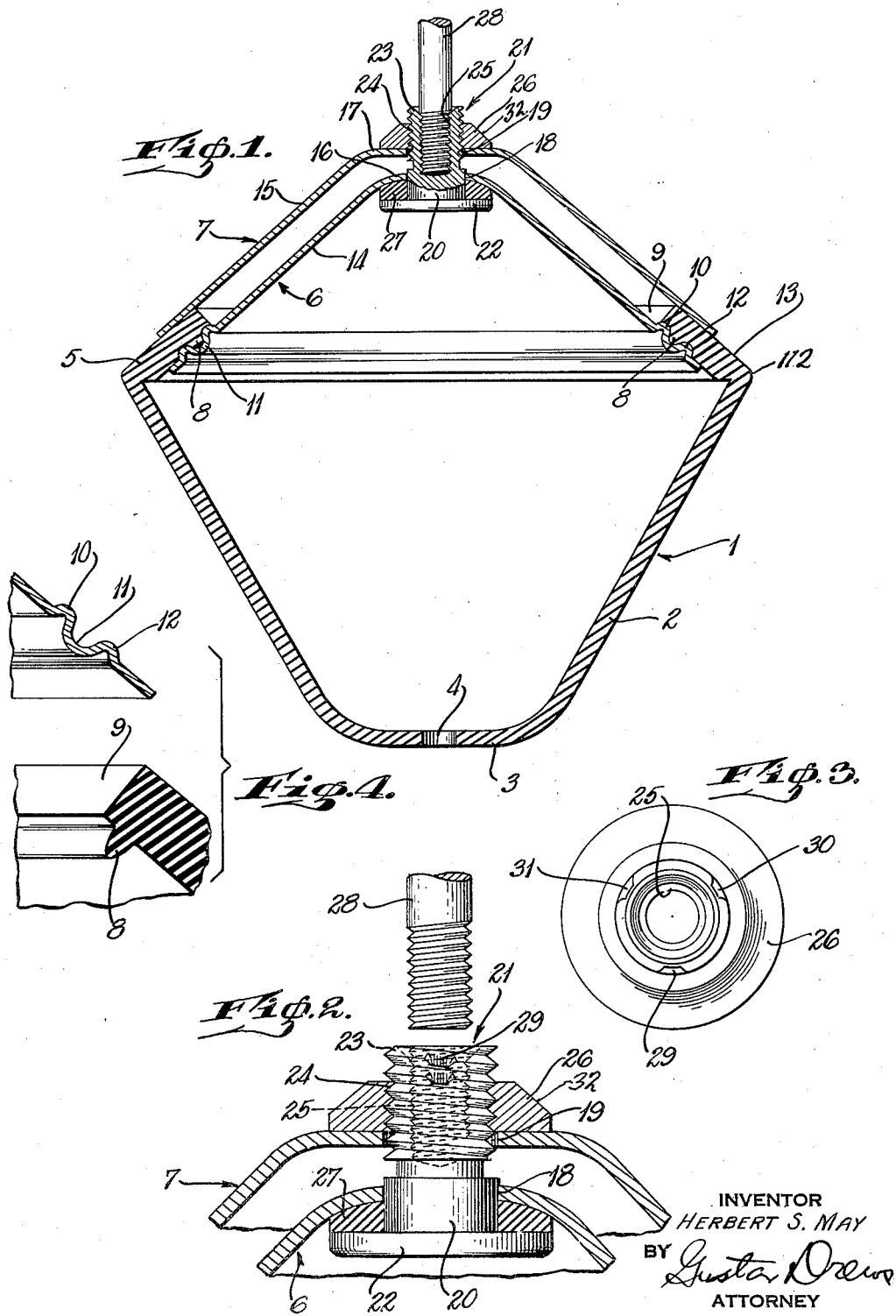

2,239,923

UNITED STATES PATENT OFFICE 2,239,923

TANK BALL

Herbert S. May, Great Neck, N. Y., assignor to American Rubber Products Corporation, New York, N. Y., a corporation of New York Application March 2, 1940, Serial No. 321,837

6 Claims. (Cl. 4—56)

This invention relates to tank balls in general and more especially to metal top tank balls such as disclosed in Patent No. 1,447,193, dated March 6, 1923.

Among the objects of the present invention, it is aimed to provide an improved metal top tank ball having a conical shaped rubber valve member instead of a spherical shaped rubber valve member heretofore used with this type of tank ball, whereby the use of one and the same ball may be extended for employment to several different sized valve seats.

It is still another object of the present invention to provide an improved metal top tank ball having two complemental shells for engaging the wall portion of the rubber valve member having an annular shoulder or shoulders extending from the outer surface of the inner metal shell to cooperate with an annular shoulder or shoulders extending inwardly from the inner face of the wall portion of the rubber valve member to facilitate production and expedite assembly by maintaining the inner shell in place until the outer shell and the connection at the apex of the two shells are placed in position for assembly.

It is still another object of the present invention to provide an air-tight, water-tight joint not only between the two metal shells and the wall portion of the rubber valve member by the cooperation of outwardly extending shoulder or shoulders, in the inner metal shell, with an inwardly extending shoulder or shoulders in the wall portion of the rubber valve member, but also by the cooperation of the rubber washer between the inner head of the connecting spud with the inner adjacent face of the inner metal shell.

These and other features, capabilities and advantages of the invention will appear from the subjoined detail description of one specific embodiment thereof illustrated in the accompanying drawing, in which Figure 1 is a transverse section of a metal top tank ball on an enlarged scale made according to the present invention;

Fig. 2 is a partly exploded transverse section on a still further enlarged scale of the connection between the apices of the metal shells;

Fig. 3 is a plan of the upper portion of the tank ball shell illustrated in Fig. 2; and Fig. 4 is a fragmental exploded transverse section of a metal shell and rubber flange before assembly.

In the embodiment shown, there is provided a rubber valve member 1 having a main conical wall member 2, a lower inwardly extending apex portion 3, provided with a central opening 4, and an upper enlarged conical flange 5 extending inwardly and upwardly from the widest portion of the wall member 2. The opening 4 in the present embodiment, where the tank ball is made for extended application as aforesaid, so as to replace the present metal top tank balls ranging from the two and one-quarter inch size to the three inch size more or less, need not exceed one-eighth of an inch in diameter. With all rubber top tank balls where the top is composed of rubber as well as the conical valve member, it has been found necessary heretofore to make the opening at the center of the diminished apex portion of the valve member not less than one-half of an inch in diameter and generally larger to enable removing the core of the mold. With all such rubber balls, not only must the opening be large enough to make it possible to stretch the molded rubber portion around the widest diameter of the core which generally exceeds two inches, but in addition, the rubber at the opening must be thin enough and/or of a sufficiently high grade rubber compound to make such stretching possible. On account thereof, unless extreme care is exercised, it is not unusual to tear or fracture the edge of the diminished portion at this opening, and thereby make the ball absolutely useless for the purpose intended. With applicant's arrangement, the opening 4 may be reduced to a size just large enough to facilitate ready entrance of air therethrough, no mold core being required to be forced therethrough at the end of the molding operation, and furthermore, consequently no heed need be given to the thickness of the wall at this opening for the protection of the peripheral edge of the opening.

The flange 5 preferably is made of a greater thickness than that of the wall 2 due to the fact that this flange 5 serves primarily as an anchor for engagement with the metal shells 6 and 7 constituting the main portion of the metal top of the ball.

In addition, this flange 5 has an inwardly extending annular shoulder 8 which is preferably semi-elliptical or semi-oval as shown when molded, removed from the inner or upper free edge 9 of the flange 5 sufficient to accommodate the outwardly extending shoulder 10 of the shell 6 between the free edge 9 and the shoulder 8. Furthermore, the shoulder 8 is preferably greater in height as shown than the depth of the depression 11 between the annular shoulders 10 and 12 extending outwardly from the lower end portion of the shell 6 so that the crest of the shoulder 8 engages immediately with the bottom of the depression or trough 11 and the shoulder 10 engages the upper face or bead of the shoulder 8 in the initial step of assembly thereby to facilitate proper positioning of the shell 6 relative to the rubber valve member 1. The shoulder or bead 8, however, is also wide enough in its initial uncompressed form to practically fill the recess 11 so that upon pressure being subsequently applied in drawing the two shells 6 and 7 together, the bead or shoulder 8 will effectively fill the depression 11 to cooperate with the shoulders 10 and 12 pressed into the body portion of the flange 5 to either side of the bead 8 to form an absolutely air-tight, water-tight joint. The depression 11 extends from the crest of the shoulders 10 and 12, in the present instance at least to a distance inwardly of the shell 6 equal to the distance that the crests of the shoulders 10 and 12 extend outwardly of the shell 6.

The shell 6 is preferably composed of an inexpensive metal immune to water and corrosion under normal conditions, such as zinc, and the shell 7 similarly is preferably composed of an inexpensive metal immune to water and corrosion under normal conditions but generally of a more rigid substance than zinc, such for instance as copper, since being positioned on the outside, it is necessarily exposed to greater wear and tear. The free edge of the copper shell 7 may terminate and preferably terminates at a point directly opposite the bead or shoulder 12 and spaced from the peripheral edge 112 to clear the lettering or marking such as size notations and the like generally marked in the area 13.

The two shells 6 and 7 consist essentially of conical skirts 14 and 15 extending downwardly from the crown portions 16 and 17 respectively, the dimensions of the shell 6 necessarily being slightly larger so that the skirt 15 and crown 17 may be properly positioned on the outside and in substantial alinement with the skirt 14 and crown portion 16 of the shell 6. The crown portions 16 and 17 have alined openings 18 and 19 respectively, the opening 18 having a very snug, friction fit so that when the enlargement 20 of the spud 21 is forced into the opening of the metal shell 6 by mechanical means, it will stay in position, facilitating the assembly until the shell 7 and collar 26 are applied. Otherwise, if the spud 21 does not stay in position, it makes an awkward job to assemble. The enlargement 20 of the spud 21 as shown is provided with a disc shaped head 22 at one end of said enlargement 20, and a chambered stem 23 having an external left-hand thread 24 and an internal right-hand thread 25. The spud 21 is preferably composed of brass to receive the brass collar 26 on its left-hand thread 24.

In assembled position as shown in Fig. 1, a rubber washer 27 snugly fitting the enlargement 20 is positioned between the head 22 and the inner face of the crown portion 16 of the inner shell 6, with the enlargement 20 extending through the opening 18 in the shell 6 as shown and as above described, and the left-hand thread 24 of the stem freely clearing the opening 19 in the crown portion 17 of the outer shell 7, and the collar 26 threaded on the left-hand thread 24 of the stem 23 and engaging the outer face of the crown portion 17. As shown in Fig. 1, the internal right-hand thread of the stem 23 is provided to engage the thread of the conventional connecting rod 28.

The oppositely directed threads 24 and 25 of the stem 23 are provided in order to protect the stem 23, and consequently to prevent the spud 21 from backing off the collar 26 when attaching the rod 28. As a further insurance against this undesired loosening of the spud 21 and its collar 26, as shown in Figs. 2 and 3, particularly if and when the rod 28 is removed, the threads 24 of the stem 23 are jammed after the collar 26 has been screwed into position preferably at the three points as indicated at 29, 30 and 31, see Fig. 3.

When assembling the tank ball, it is only necessary first to nest the two shells 6 and 7 with the spud 21 extending therethrough with the rubber washer 27 disposed between the head 22 and the inner face of the crown portion 16 of the inner shell 7, and the collar 26 threaded on the thread 24 with the shells 6 and 7 widely spaced apart so that they will receive the flange 5 of the rubber valve member 1. Thereupon the shoulder 8 is disposed in the depression 11 properly to position the rubber valve member 1 relative to the shell 6, and thereupon the collar 26 screwed down tightly until the rubber washer 27 is squeezed and spread out into the shape shown in Fig. 1 effectively to form an air-tight and water-tight joint between the interior of the shell 6 and the outside thereof, and until the rubber flange 5 is squeezed out into the shape shown in Fig. 1 where the elliptical shaped shoulder 8 is squeezed or spread out to fill the depression 11, and in turn the shoulders 10 and 12 pressed into the flange 5 as shown effectively to form an air-tight, water-tight joint between the interior of the tank ball and the outside thereof.

With the aforesaid arrangement then, as also shown in the Watt patent aforesaid, the only access to the interior of the tank ball is through the small opening 4. Due to the conical shape of the wall 2, this ball can find a much wider use than that of a spherical shaped rubber valve member, since it can satisfactorily replace a large number of sizes of such spherical shaped rubber valve members, for instance, a group including the two and one-quarter inch, two and one-half inch, two and five-eighths inch, two and three-quarter inch, and three inch balls, whereas with the spherical shaped rubber valve members a separate ball had to be used for each different size.

Aside from the foregoing, as distinguished from all-rubber, conical shaped rubber ball valve members, with the present invention a small opening such as the opening 4 may be provided, and the portion of the valve member 1 as at 3 is never subjected to the wear and tear required with the all-rubber, conical rubber ball members where the core of the mold must be removed from the interior of the ball through such opening.

Preferably as shown, the upper face of the collar 26 is beveled as shown at 32.

It is obvious that various changes and modifications may be made to the details of construction without departing from the general spirit of the invention, as set forth in the appended claims.

I claim:

1. The combination of a metal top tank ball having a conical rubber valve member, a flattened apex portion with a central opening therein and a flange at its enlarged end also conical but extending inwardly from such enlarged end, two complemental metal shells each having a conical skirt and a flattened crown portion at the apex portion thereof with alined central openings in said crown portions, a spud including a head and a chambered stem having an external lefthand thread and an internal righthand thread, a rubber washer disposed between the inner face of the crown portion of the inner shell and the head of the spud with the stem extending outwardly through the alined openings of said shells and the rubber washer cooperating with the inner shell and head of the spud to effect a water-tight seal at the crown portion of the inner shell, a collar screw-threadedly engaging the lefthand thread abutting against the outer shell, and a connecting rod screw-threadedly engaging the righthand thread, the outer free end portions of the skirts of the shells engaging and clamping the flange of the rubber valve member between them.

2. The combination of a metal top tank ball having a conical rubber valve member, a flattened apex portion with a central opening therein and a flange at its enlarged end also conical but extending inwardly from such enlarged end, two complemental metal shells each having a conical skirt and a flattened crown portion at the apex portion thereof with alined central openings in said crown portions, a spud including a head and a chambered stem having an external lefthand thread and an internal righthand thread, a rubber washer disposed between the crown portion of the inner shell and the head of the spud with the stem extending outwardly through the alined openings of said shells, a collar screw-threadedly engaging the lefthand thread abutting against the outer shell, and a connecting rod screw-threadedly engaging the righthand thread, the outer free end portions of the skirts of the shells engaging and clamping the flange of the rubber valve member between them, the flange on the rubber valve member being thicker than the wall of the valve member proper and having an inwardly extending annular shoulder, the skirt of the inner shell adjacent its free end having two concentric annular shoulders spaced from one another with a depression between them to receive the annular shoulder of the flange, the upper shoulder of the inner shell having a greater diameter at its outer periphery than the diameter at the inner periphery of the shoulder on the flange to enable such upper shoulder to rest on the upper face of the shoulder on the flange to facilitate positioning the several elements of the tank ball before securing the collar down tightly to squeeze the washer between the head and the inner face of the inner shell to form an air-tight and water-tight joint, and to squeeze the flange between the two shells so that the annular shoulder on the flange will completely fill up the depression between the two shoulders in the inner shell to form an air-tight and water-tight joint between the inner shell and the rubber flange.

3. The combination of a metal top tank ball having a conical rubber valve member, a flattened apex portion with a central opening therein and a flange at its enlarged end also conical but extending inwardly from such enlarged end, two complemental metal shells each having a conical skirt and a flattened crown portion at the apex portion thereof with alined central openings in said crown portions, a spud including a head and a chambered stem having an external lefthand thread and an internal righthand thread, a rubber washer disposed between the inner face of the crown portion of the inner shell and the head of the spud with the stem extending outwardly through the alined openings of said shells and the rubber washer cooperating with the inner shell and head of the spud to effect a water-tight seal at the crown portion of the inner shell, a collar screw-threadedly engaging the lefthand thread abutting against the outer shell, and a connecting rod screw-threadedly engaging the righthand thread, the outer free end portions of the skirts of the shells engaging and clamping the flange of the rubber valve member between them, the central opening in the apex portion of the rubber valve member being not greater than one-eighth of an inch in diameter.

4. The combination of a metal top tank ball having a conical rubber valve member, a flattened apex portion with a central opening therein and a flange at its enlarged end also conical but extending inwardly from such enlarged end, two complemental metal shells each having a conical skirt and a flattened crown portion at the apex portion thereof with alined central openings in said crown portions, a spud including a head and a chambered stem having an external lefthand thread and an internal righthand thread, a rubber washer disposed between the inner face of the crown portion of the inner shell and the head of the spud with the stem extending outwardly through the alined openings of said shells and the rubber washer cooperating with the inner shell and head of the spud to effect a water-tight seal at the crown portion of the inner shell, a collar screw-threadedly engaging the lefthand thread abutting against the outer shell, and a connecting rod screw-threadedly engaging the righthand thread, the outer free end portions of the skirts of the shells engaging and clamping the flange of the rubber valve member between them, the oppositely directed external and internal threads of the stem serving to anchor the collar from backing off when screwing the connecting rod into place, and recesses crushed into the lefthand threads beyond the collar after it has been screwed into place to cooperate with said oppositely directed external and internal threads to anchor the collar from backing off.

5. The combination of a metal top tank ball having a conical rubber valve member, a flattened apex portion with a central opening therein and a flange at its enlarged end also conical but extending inwardly from such enlarged end, two complemental metal shells each having a conical skirt and a flattened crown portion at the apex portion thereof with alined central openings in said crown portions, a spud including a head and a chambered stem having an external lefthand thread and an internal righthand thread, a rubber washer disposed between the crown portion of the inner shell and the head of the spud with the stem extending outwardly through the alined openings of said shells, a collar screw-threadedly engaging the lefthand thread abutting against the outer shell, and a connecting rod screw-threadedly engaging the righthand thread, the outer free end portions of the skirts of the shells engaging and clamping the flange of the rubber valve member between them, the flange on the rubber valve member being thicker than the wall of the valve member proper and having an inwardly extending annular shoulder, elliptical in cross section, the skirt of the inner shell adjacent its free end having two concentric annular shoulders spaced from one another with a depression between them to receive the annular shoulder of the flange on the rubber valve member, the annular shoulder of the flange having a greater height than the depth of the depression and normally having a greater diameter at its inner periphery than the diameter of the inner periphery of the depression so that it may effectively engage the depression during assembly before being compressed to facilitate positioning the several elements of the tank ball before screwing the collar down tightly to squeeze the washer between the head and the inner face of the inner shell to form an air-tight and water-tight joint, and to squeeze the flange between the two shells so that the annular shoulder on the flange will completely fill up the depression between the two shoulders in the inner shell and the adjacent shoulders in the inner shell will be intimately pressed into the flange to form an air-tight and water-tight joint between the inner shell and the rubber flange.

6. The combination of a metal top tank ball having a conical rubber valve member, a flattened apex portion with a central opening therein and a flange at its enlarged end also conical but extending inwardly from such enlarged end, two complemental metal shells each having a conical skirt and a flattened crown portion at the apex portion thereof with alined central openings in said crown portions, a spud including a head and a chambered stem having an external lefthand thread and an internal righthand thread, a rubber washer disposed between the inner face of the crown portion of the inner shell and the head of the spud with the stem extending outwardly through the alined openings of said shells and the rubber washer cooperating with the inner shell and head of the spud to effect a water-tight seal at the crown portion of the inner shell, a collar screw-threadedly engaging the lefthand thread abutting against the outer shell, and a connecting rod screw-threadedly engaging the righthand thread, the outer free end portions of the skirts of the shells engaging and clamping the flange of the rubber valve member between them, the inner shell being composed of zinc, the outer shell of copper, and the spud and collar of brass.

HERBERT S. MAY.